United States Patent [19]

Brauns et al.

[11] Patent Number: 4,584,578

[45] Date of Patent: Apr. 22, 1986

[54] PROGRAMMABLE INTERFERENCE BLANKING SYSTEM

[75] Inventors: Frank Brauns, Deerfield Beach; Charles S. Walters, Plantation; Thomas W. Stuff, Delray Beach, all of Fla.

[73] Assignee: Novatronics, Inc., Pompano Beach, Fla.

[21] Appl. No.: 476,771

[22] Filed: Mar. 18, 1983

[51] Int. Cl.[4] .............. G01S 7/28

[52] U.S. Cl. .............. 343/5 R

[58] Field of Search .............. 343/5 DP, 7.5, 18 E, 343/5 R; 375/104; 455/78, 217, 296

[56] References Cited

U.S. PATENT DOCUMENTS 3,821,751 6/1974 Loos .............. 343/7.5 X 3,911,432 10/1975 Williams .............. 343/7.5 X 4,010,468 3/1977 Fishbein et al. .............. 343/7.5

*Primary Examiner*—Thomas H. Tarcza

*Assistant Examiner*—Mark Hellner

*Attorney, Agent, or Firm*—Oltman and Flynn

[57] ABSTRACT

A programmable interference system for use with clustered radio transmitters and receivers operating aboard aircraft, as well as seafaring or land based installations, and which may interfere with each other. The invention uses a central processing unit with associated memory which provides pulse treatment including delay and/or extension of the blanking pulses as generated by the radio transmitters and such that the pulse treatment may be programmed by preselecting and storing the parameters of the pulse treatment in the memory from where they may be called into operation to control variable delay and extension circuit elements. The invention is especially suited to operate with aircraft having a multiplex bus that carries all the control data from flight controls as well as from the cockpit on a time divided multiplexed basis.

19 Claims, 18 Drawing Figures

FIG. 1

FIG. 5
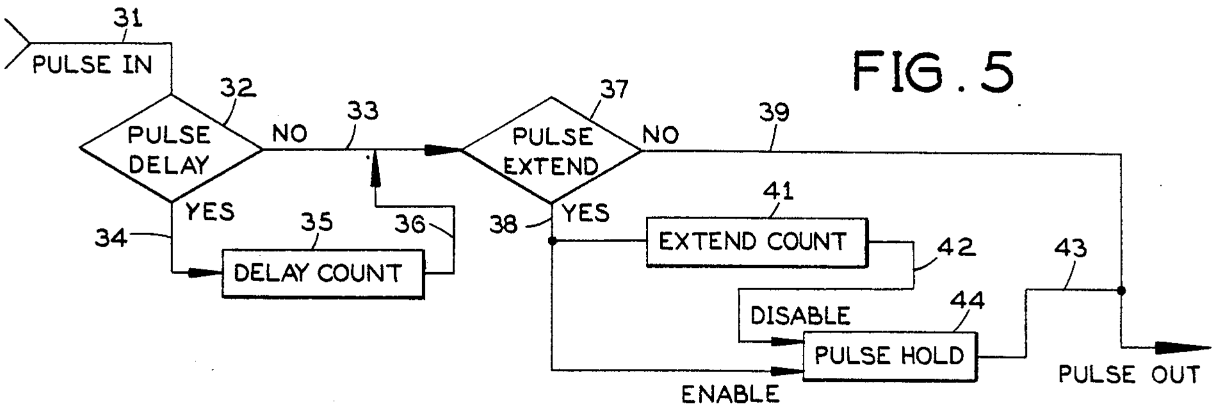
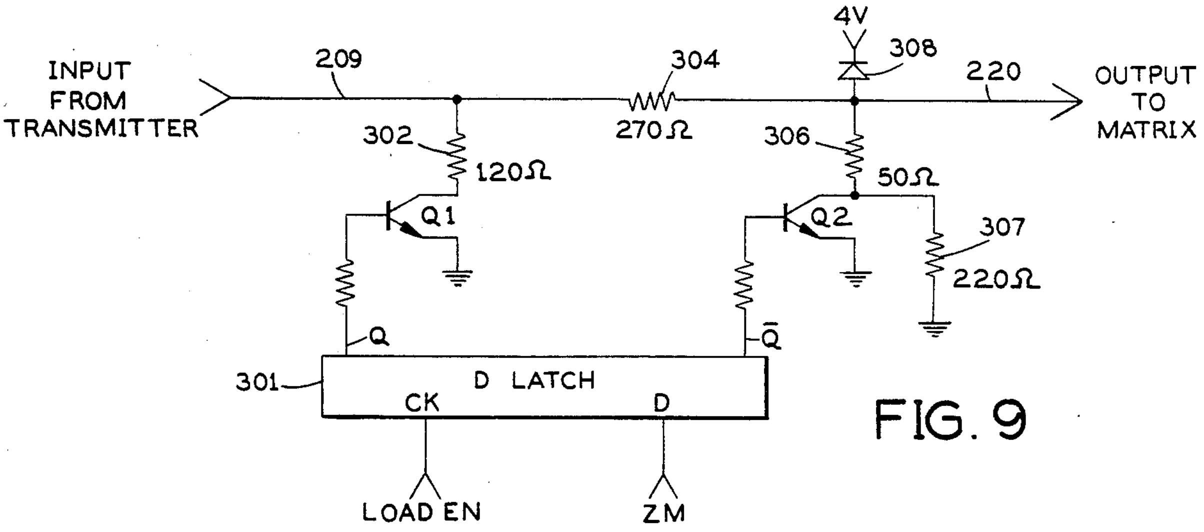
FIG. 9
FIG. 10
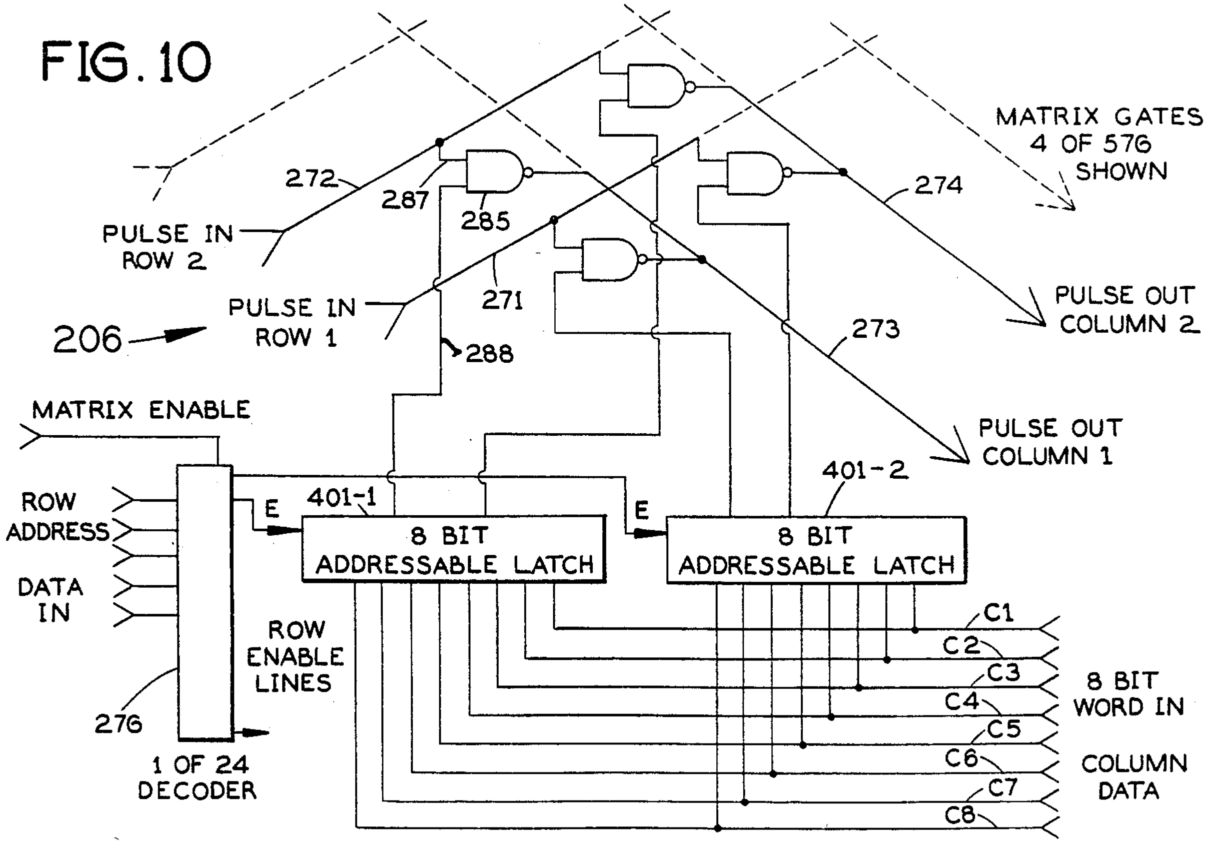

PROGRAMMABLE INTERFERENCE BLANKING SYSTEM

SUMMARY OF THE INVENTION

The invention relates to a system for blanking communications, navigational and electronic warfare radio receivers that operate in close proximity to coordinated transmitting equipment.

Systems of this kind are most frequently used in conjunction with military units, such as aircraft in combat configurations, as well as other military units that employ within a relatively small area several radio transmitters and receivers for communication, navigation and electronic warfare. As is well known, radio transmitting and receiving equipment is used extensively in modern warfare for many different purposes, such as two-way communications between military units, navigation in relation to fixed base stations, navigation by means of radio-signals transmitted in directed beams and detected as echoes returned from ground or other military units, guidance of radio-controlled missiles, jamming of enemy radio, and other purposes. It is also well known that whenever radio transmitters and receivers are operated in close physical proximity, any powerful transmitted signals have a deleterious effect on the radio receiving equipment in that such signals may cause damage to the "front end" circuitry of radio receivers, and especially because powerful radiated signals may enter the sensitive circuits of the radio receiving apparatus and throw them out of their finely balanced conditions such that an appreciable time may elapse before the receiver is again capable of performing as intended. Modern aircraft, especially of the military type, are equipped with a large number of transmitters, each of which may have such a deleterious effect on any one of a large number of receivers also on the aircraft due to the relatively small distances between the various antennas with which such aircraft are usually equipped.

For this reason, radio receiving equipment operated in military units and under other but similar conditions is equipped with a so-called blanking function. The blanking function, when activated, operates to de-sensitize radio receivers by the application of a pre-determined potential, such as ground potential or another preselected potential, to an assigned blanking input terminal on that receiver. During the brief time interval that a receiver is blanked, it is incapable of receiving any radiated signals but as soon as the blanking condition is removed the receiver is immediately capable of operating as intended.

In order to perform the blanking function in complex aircraft with many receivers and transmitters and low antenna isolation, it has been customary to provide "hard-wired" interconnections from the transmitters to the receivers, using dedicated hardware to provide blanking signals from transmitters to the affected receivers and fixed signal treatment to provide the necessary blanking signal delay and/or extension. The conventional "hard-wired" approach provides an output connection configuration which is inflexible and difficult to adapt to varying aircraft configurations.

In accordance with the present invention, a matrix is provided which receives its input signals from the transmitters and provides the output connection configurations to those receivers that are affected by the associated transmitter signals.

The use of a matrix, in accordance with this invention, provides a much more flexible approach in that crosspoint links may be added to or removed from the matrix in order to accommodate varying requirements to the blanking configuration, as needed for varying missions requirements.

In military aircraft it is very desirable to have such flexibility in adapting the blanking configuration to the aircraft flight configuration since modern warfare requires a great deal of flexibility in arranging the armaments of an aircraft and in its operating conditions. It may even be necessary to alter the flight configuration of an aircraft during a mission. An example of this is the Terrain Following Radar operation at very low altitude, which becomes pre-empted by the need for an active radar warning receiver as altitude increases. It is therefore very desirable to have a blanking system that is very flexible in order to meet the varying requirements of the mission and even to have a blanking system that may be modified by the pilot or the flight control apparatus during such a mission.

The present invention provides a novel blanking system that can be quickly modified and adapted to varying flight configurations. This object is attained by storing so-called blanking configurations in an electronic memory that can be retrieved by the flight control and firing control apparatus or by the pilot and can be readily adapted to any flight configuration and mission objective and can be prepared in advance or during a mission, as it may best serve the mission objectives.

It is therefore a primary object of the present invention to provide a novel flexible and adaptable interference blanking system for highly complex aircraft.

It is another object to provide a very flexible blanking system that provides a plurality of blanking configurations to suit a plurality of flight configurations.

It is still another object to provide a blanking system that may be dynamically modified in response to varying flight and mission requirements.

It is still another object to provide a blanking system that occupies a relatively small amount of space and draws a relatively small amount of power from the aircraft electrical system.

It is still another object to provide a blanking system that is highly reliable and readily maintainable by personnel trained in aircraft maintenance.

Other objects and advantages of the invention will become clear in the course of the following specification with appended drawings.

BRIEF DESCRIPTION OF THE DRAWINGS

FIG. 5 is an abbreviated flow chart showing the functional steps pertaining to the pulse conditioning process, as performed in the first embodiment;

FIG. 9 is an abbreviated circuit diagram of a part of the pulse inpedance matching section of the input pulse conditioning logic;

FIG. 10 is an abbreviated logic diagram of the 24×24 programmable matrix concept of the second embodiment;

DETAILED DESCRIPTION

The following disclosure describes two preferred embodiments of the present invention. It is to be understood, however, that the invention is capable of other embodiments that are obvious to those skilled in the art and therefore fall within the scope of the invention.

The description of the preferred embodiments is based on the use of conventions, symbols and terms that are common in the description of schematic logic diagrams and are well known to the practitioners of these arts, and are described in reference books such as "Microcomputer-Based Design" by J. B. Peatman, published by McGraw-Hill, Library of Congress No. ISBN 0-07-049138-0, and "Digital Systems" by F. J. Hill et al, published by John Wiley & Sons, Library of Congress No. ISBNO-471-39605-2, and others. The terminology used is for description and not for limitation.

It is also to be understood that the preferred embodiments make use of so-called microcomputer control with associated control programs and software which could be based on any one of a large number of microcomputer systems manufactured by different manufacturers, and which are different in organization and instruction sets but are still capable of performing all the functions required for the construction of the embodiments of the present invention, and which are obvious to those skilled in the art and are described in principle in reference books such as those referenced above.

Figure 1:
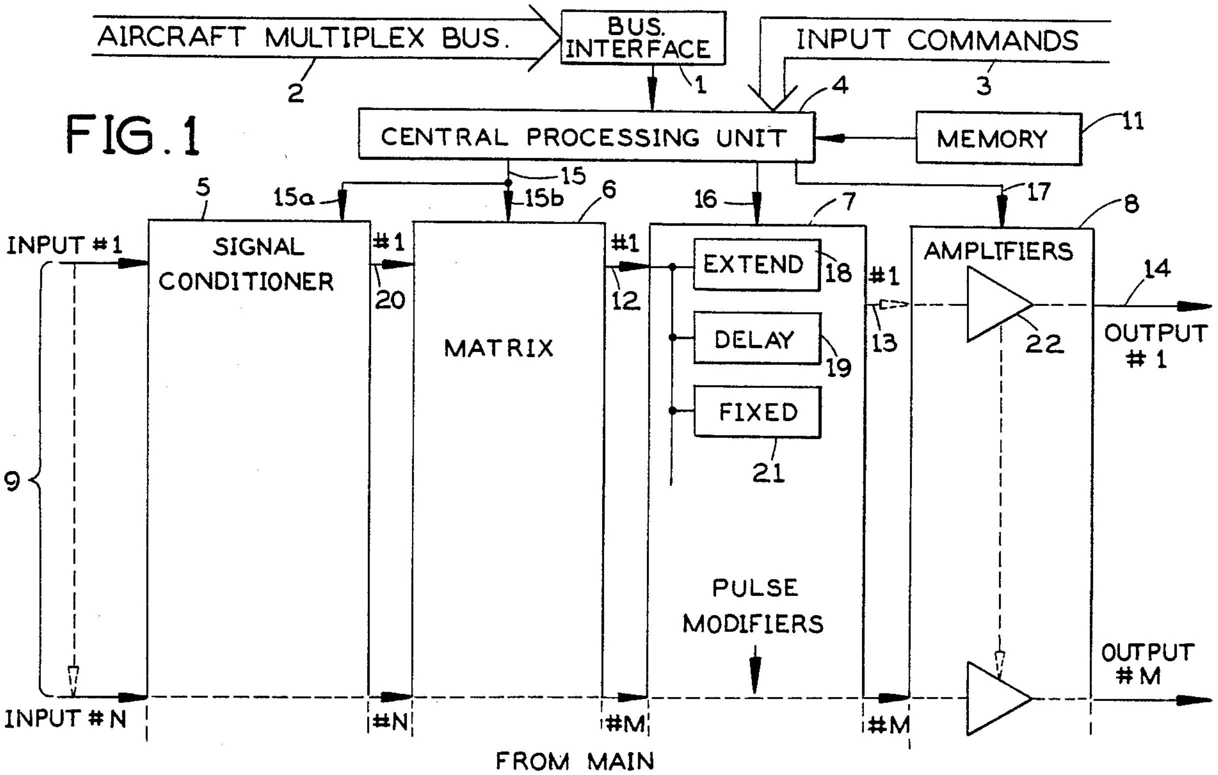
FIG. 1 is a block diagram of the invention showing its major functional blocks and their interconnections.

In the following description of the first embodiment, FIG. 1 shows the major functional hardware blocks and their mutual interconnections and their relation to the general aircraft control system. The aircraft multiplex bus 2 is part of the general data communications and control system for the aircraft. This bus comprises a pair of wires which tie together the various sections of the aircraft control apparatus and transmit instructions and messages in digitally encoded form from one section to another. The transmissions on the bus typically take place at a high speed in accordance with a so-called bus protocol that applies to all pieces of apparatus, including the blanking system, connected to the bus. For the purpose of the present invention, the blanking system receives information that is needed for the blanking system to perform its functions as a part of the aircraft control system.

Other input instructions may be delivered from aircraft control sections to the blanking system via a non-multiplexed bus 3. These are shown as "Input Commands" in FIG. 1.

The input instructions and commands to the blanking system are first delivered to a bus interface 1, which serves as a temporary receiving and storing location for the digital codes that constitute instructions and commands from the multiplex bus 2 and performs the aforesaid bus protocol functions.

Figure 3:
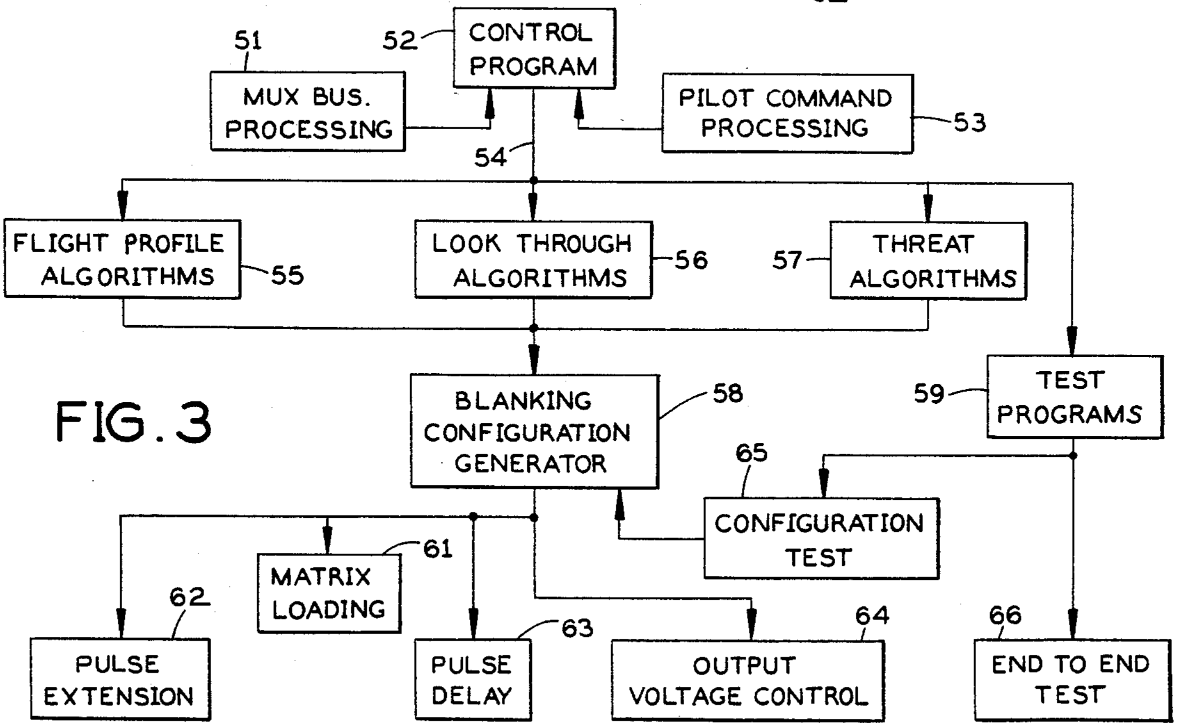
FIG. 3 is a more detailed block diagram of the invention showing its operational functional software blocks and their interrelations.

A central processing unit (CPU) 4 contains a microprocessor that is connected with a memory section 11. The memory section contains all control programs in binary coded numbers and instructions. The memory consists of memory cells, each of which may exist in two states, namely as a "one" (1) or a "zero" (0), also designated "on" or "off", respectively. The memory 11 contains, in stored digitally encoded form, the control programs which constitute the control functions for the blanking system. The memory 11 also contains transitory information which the CPU requires in order to perform its operations. The control programs in memory 11 are subdivided into smaller sub-sections or modules, each having discrete, defined functions within the entire blanking system. FIG. 3 shows the more significant sub-sections of the control programs and is described in more detail below.

The control programs consist of sequentially numbered listings of digitally encoded instructions that are stored in the memory 11. The instruction format and encoding is part of the instruction set which is again a part of the structure of the microprocessor, as originally established by the designer of the microcomputer. The control programs, acting through the hardware of the microprocessor, are capable of operating on and monitoring other sections of hardware which are part of the blanking system. There are four main sections of hardware of this type. They are shown in FIG. 1 as the signal conditioner 5, the matrix 6, the pulse modifiers 7, and the amplifiers 8. Sections 5, 6, 7 and 8 are connected via leads 15, 16 and 17 to the CPU 4 and receive instructions from it on how to perform their operations. The leads 15, 16 and 17 may consist of a plurality of individual conductors, depending on the construction of the system. Lead 15 branches into two parts, 15*a* and 15*b*, which control the signal conditioner 5 and the matrix 6, respectively.

The signal conditioner 5 is connected via N discrete leads, shown collectively at 9 in FIG. 1 and numbered from 1 to N, to radio transmitters in the aircraft that are served by the blanking system. When one of these transmitters is preparing to transmit a radio signal, a pulse is sent from the transmitter via its associated input lead at 9 to the signal conditioner 5.

Each input lead is connected to a corresponding signal conditioning circuit in section 5. The signal conditioning circuits operate to standardize all input pulses to one standard pulse level before the pulse is admitted to the next section, the matrix 6. The individual radio transmitters, which are constructed in accordance with different specifications, do not always produce blanking pulses that are of uniform amplitude, polarity and duration and may therefore need to undergo this standardization process. If the pulse delivered from any transmitter needs modification, the corresponding circuit of the pulse conditioner 5 will modify the pulse to produce a uniform standard output pulse. In the preferred embodiment of the invention the blanking pulses are standardized only in relation to their output level but the pulse duration is not modified. After the pulses have been standardized in the signal conditioner 5, they are delivered to the matrix 6 via one of N connecting leads 20.

Figure 4:
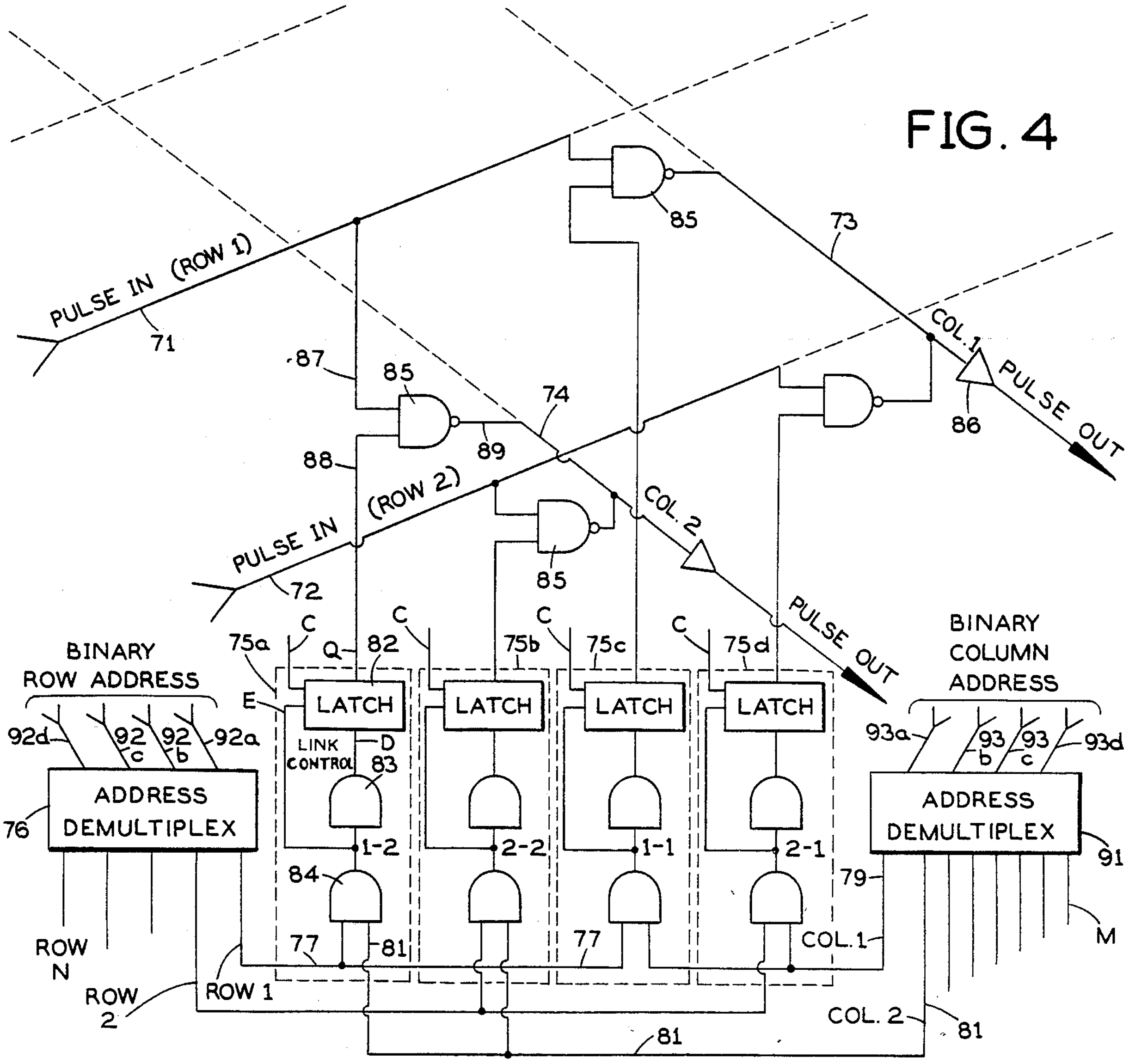
FIG. 4 is a part of the schematic circuit diagram of a part of the system matrix of the first embodiment, with associated matrix controls.

The matrix 6 consists of N rows and M columns superimposed on one and another forming crosspoints equal in number to N times M. In one practical embodiment the matrix may have 24 rows and 24 columns, so that there are 576 crosspoints, as described below under the second embodiment. At each crosspoint one row is connected to one column by a crosspoint link. FIG. 4 shows a small part of such a matrix. Two rows 71 and 72 (ROW 1 and ROW 2, respectively) and two columns, 73 and 74 (COL 1 and COL 2, respectively) have four crosspoints.

In the explanation of the operation of the logic circuits of the invention, the usual convention is used, that a lead which has logic condition 1, also called "on", has an electrical potential called "high", which typically may be plus five volts as opposed to the logic condition 0, also called "off", or "low", which is usually close to ground potential. Different logic systems employ different potentials representing logic 1 and 0, but the conventions described above and used hereinafter are based on the logic system called TTL (Transistor-Transistor-Logic). Other logic systems may be used in the invention.

At each of the four crosspoints in FIG. 4 a link 85 connects the row to the column. The link 85 is a NAND gate having two input leads 87 and 88 and one output lead 89. A high on each of the input leads 87 and 88 to gate 85 will produce a low on the output lead 89, which is connected to column 74. The gate 85 is of the type called tri-state which allows the parallel connection of a large number of such gates to a single common lead, in this case lead 74. Any one of the gates producing an output that is low will cause the entire lead 74 with all the attached tri-state gates to go low.

Input lead 88 to the gate 85 connecting row 1 to column 2 is under control of a link control circuit 75*a* having an input AND gate 84, followed by a single gate 83 and a latch circuit 82. The latch 82 is a memory element that may be set to its logic high state by simultaneous application of a high on each of the input leads to the AND gate 84. A high output from gate 84 sets first the enable lead E to the latch high, and after a short delay caused by the single input gate 83 the set lead D to the latch also goes high, causing the latch circuit output lead Q to go high and stay high after the gate 84 is no longer activated by its two input leads simultaneously being high. The latch output stays high until it is reset to its normal condition by a high momentarily applied to its clear lead C or by applying a low to the D lead while E is high.

Similar link control circuits 75*b*, 75*c* and 75*d* are connected individually to NAND gates at the other crossover points in the simplified matrix shown in FIG. 4. By means of the above process, any one of the link control circuits 75*a*, 75*b*, 75*c* or 75*d* can be selected and set with its latch in its set state by selectively applying a high to the two input leads to its input gate 84.

The two input leads to the input gate 84 of circuit 75*a* are 77 and 81. Lead 77 is connected to all link control circuits (in this case, 75*a* and 75*c*) that connect to matrix row 1 (71). Lead 81 is connected to all link control circuits (in this case 75*a* and 75*b*) that connect to column 2. The selection of the proper row number, also called row address, is made by the row address decode element 76, while the proper column selection is made by the column address decode element 91.

Any one of the row addresses may be selected by applying the row address in binary code to the four address input leads 92*a*, 92*b*, 92*c* and 92*d* for the row address decode element 76. Similarly, the column address may be selected by applying the column address in binary code to the four address input leads 93*a*, 93*b*, 93*c* and 93*d* for the column address decode element 91. Since each address decode element 76 and 91 has four input leads, it follows that up to the number two raised to the power of four (16), 16 rows and 16 columns may be selected with the apparatus shown, which again may allow a total of 16 raised to the power of two, which equals 256 crosspoints that may be selected.

The matrix may be expanded, if desired, by including additional row and column address decoders and additional link crosspoints may be provided as in the second embodiment.

The binary row and address numbers are furnished from the CPU 4 via leads 15*a* and 15*b* (FIG. 1) under control of the control program stored in the memory 11. Whenever a plurality of crosspoint link controls have to be activated in order to allow an input pulse on one of the matrix rows to be connected to several column output leads at the same time, the addresses for the crosspoints to be selected will be supplied from the CPU in rapid succession, causing the corresponding link control latches 82 to be set.

The output signals from the matrix are connected to the input leads to the pulse modifier circuit 7 (FIG. 1) via one of connecting leads 12. Each input lead is connected to a group of pulse modifying elements consisting of a pulse extender element 18, a pulse delay element 19, and a fixed pulse treatment circuit 21 used when no other extension or delay is requested. The pulse modifying elements 18 and 19 are digitally controlled by means of output signals furnished from the CPU 4 via connecting lead 16, as shown in flow chart form in FIG. 2, and in more circuit detail in FIGS. 5, 6 and 7.

Figure 2:
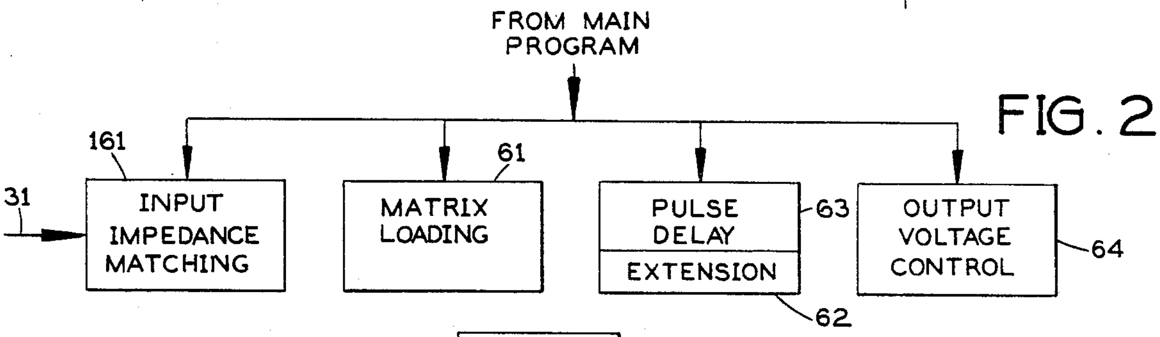
FIG. 2 is a block diagram of the functional software blocks pertaining to the pulse conditioning process.

In the flow chart, FIG. 2, four software modules perform major elements of the blanking pulse conditioning process. The modules are under control of the main program. The first module, Input Impedance Matching, 161 provides the instructions that operate to control the signal conditioner 5 (FIG. 1) via lead 15*a*. The Matrix Loading Module 61 provides the instructions that operate to control the matrix 6 via lead 15*b* (FIG. 1). The Pulse Delay/Extension module, 63 and 62, provides the instructions to operate the pulse modifiers 7 (FIG. 1) via lead 16 and the Output Voltage Control module 64 provides the instructions to operate the amplifiers 8 via lead 17 (FIG. 1).

The impedance matching function which is optionally provided in the first embodiment, is described in detail under the second embodiment in connection with FIG. 9.

In the flow chart, FIG. 5, an incoming blanking pulse arrives from the matrix at 31. At the decision point 32 the pulse may be either delayed or not delayed, depending on the requirements of the receiver destined to receive the pulse. If no pulse delay is required, the pulse is sent via the path 33 to the decision point 37 to decide if an extension of the pulse is required or not. If extension is not required, the pulse is sent out to Pulse Out on the path 39 to the receiver. If the pulse is to be delayed at decision point 32, it will be sent via path 34 to the Delay Count 35, where a preselected delay will be inserted ahead of the pulse before it goes to the decision point 37. If at 37 the pulse is to be extended, a preselected extension has to be added to the pulse at Extend Count 41. At the moment the decision to extend the pulse is made, the Yes output 38 from 37 activates a pulse enable function designated Pulse Hold, at 44. The Pulse Hold maintains the pulse in the "on" state until the end of a preselected time of the pulse extension, at which time the Extend Count 41 terminates the pulse over the path 42, which disables the pulse hold condition.

Figure 6:
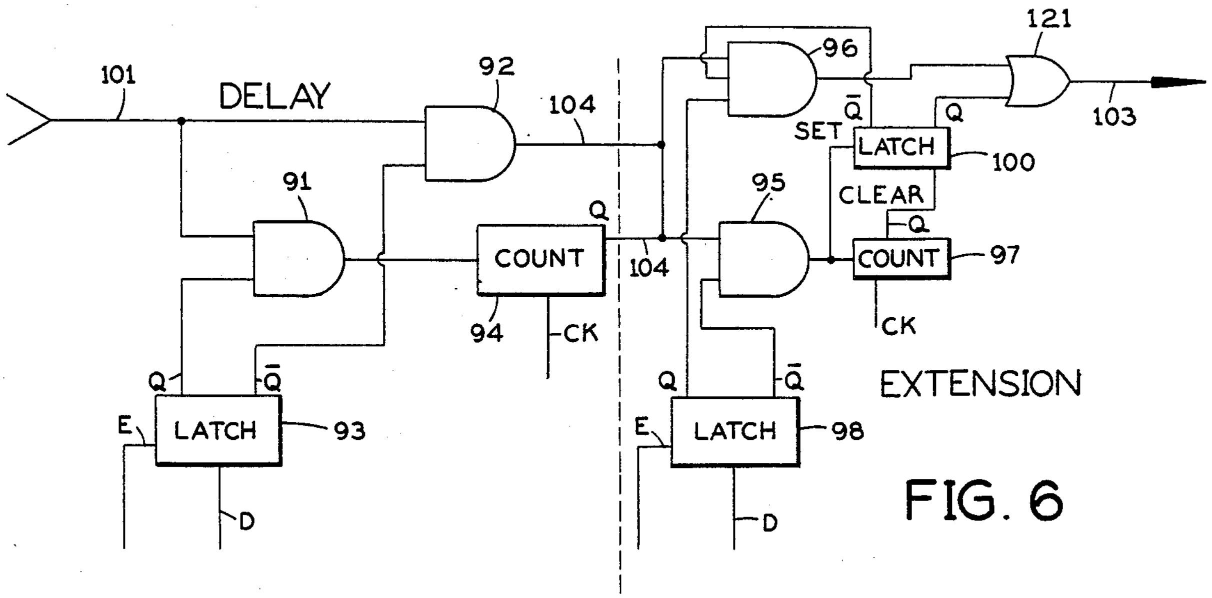
FIG. 6 is an abbreviated logic diagram of the pulse conditioning section of the system.

FIG. 6 shows an abbreviated circuit schematic diagram containing the circuit elements of the pulse delay and extension circuit.

At the start of the blanking operation, the two latches 93 and 98 are set from the CPU 4 via bus 16 (FIG. 1) and similarly the two counters 94 and 97 are set to a preselected count in case both a delay and an extension of the pulse are to be effected.

If no delay or extension is required, the latches and the counters are not set. In that case the lower inputs to AND gates 92 and 96 are set high by the respective inverted outputs $\overline{Q}$ of the latches 93 and 98 and, as a result, an incoming pulse that sets lead 101 high for the duration of the pulse is repeated through first AND gate 92 and through AND gate 96 to appear unchanged on output lead 103.

If, however, a delay of the incoming pulse is to be effected, latch 93 is set. Its output $\overline{Q}$ will then go low and disable AND-gate 92, and its output Q will go high and enable the lower input to AND gate 91, the output of which will start the counter 94. The counter will run, counting down until it has run from its preset count, driven by a continuously running clock signal on lead CK, until it has come back to its start position. When the counter reaches its start position, the number of preselected time increments used to count down the counter represents the delay intended, and its output Q goes high and sets the upper inputs to AND gates 95 and 96 high.

If no extension is required, the pulse continues out through AND gate 96 and OR gate 121 to output lead 103, but if an extension of the pulse is to be effected, the latch 98 will have been preset, as well as the counter 97, and the latch 100 will be set by an output from AND-gate 95. In that case, a high is placed by the output Q of 100 through OR gate 121 on the output lead 103, and a high from AND gate 95 starts the counter 97, which is then counted down to its start position by clock lead CK. At the end of the count, the output Q of 97 goes high and clears the latch 100, which again removes the high through OR gate 121 on output lead 103.

It follows that it is possible to modify any incoming pulse by delaying it, and/or to extend it, by controlling the two latches 93 and 98 and the two counters 94 and 97 directly from the control program stored in the memory 11 (FIG. 1). At the end of the blanking operation, the tens counter produces a carry-out which causes the contents of the latches to be reloaded into the counters.

Figure 8:
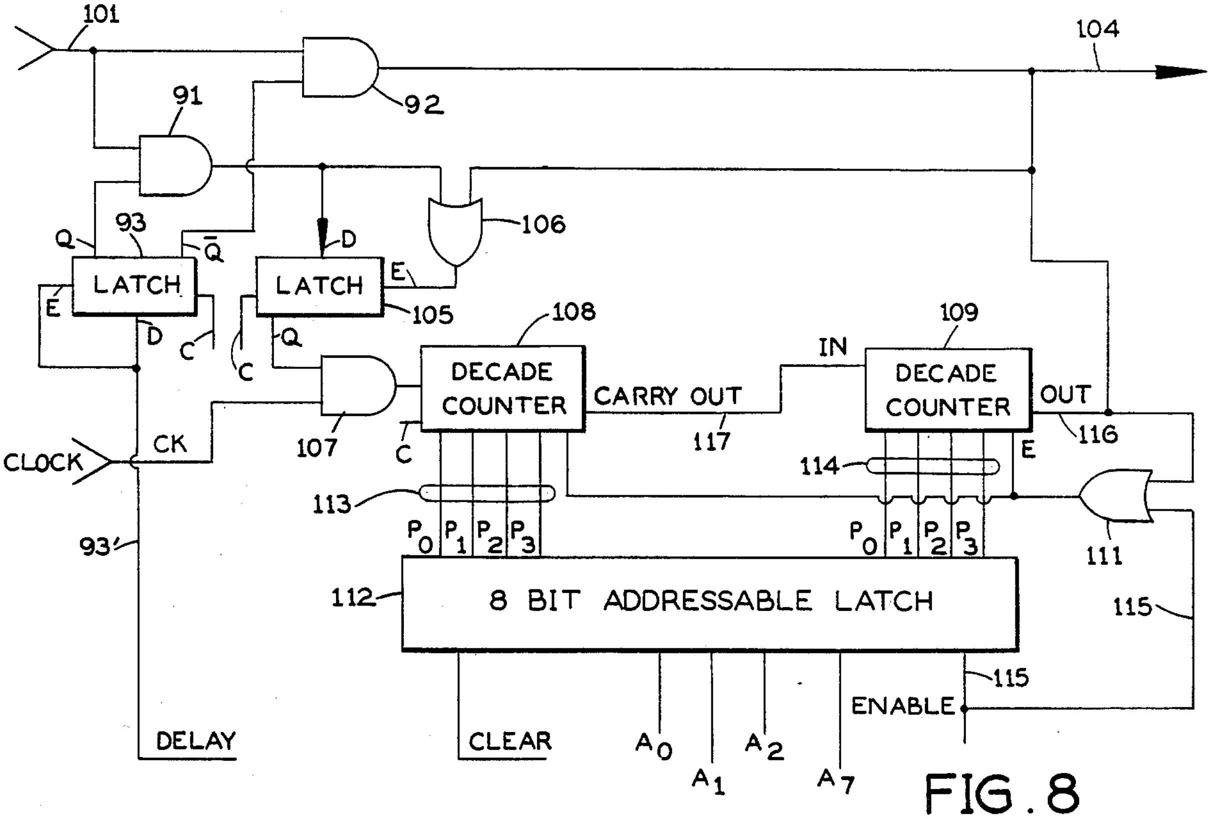
FIG. 8 is an abbreviated logic diagram of the pulse delay section of the system.

FIG. 8 shows in more detail the functions of the delay section of the abbreviated circuit of FIG. 5, just described.

Without repeating the description of the functions already described, the delay circuit is activated by activating latch 93 from the CPU 4 via the lead "DELAY" 93' which is part of bus 16 (FIG. 1). This places a low on the lower input to AND gate 92 from the output $\overline{Q}$ of latch 93 and a high on the lower input to AND gate 91 from the output Q of latch 93. A second latch 105 is set through AND gate 91 and through OR gate 106 with a high to latch enable input E and latch set lead D. Latch 105, being set, places a high from its output Q on the upper input to AND gate 107, which admits a clock CK to start driving down a counter consisting of two cascaded decade counters 108 and 109.

Each decade counter has four load leads P0, P1, P2 and P3, collectively designated 113 for counter 108 and 114 for counter 109, which operate to set in the decade counter a four bit binary number in the range from zero to 9 (decimal). The four bits for each decade counter stage are received from an eight bit addressable latch 112 in which the eight bits are first received from the CPU bus 16 (FIG. 1) at the beginning of the blanking operation and temporarily stored there until they are transferred into the two decade counters upon receipt of an enable command from the CPU on lead 115. The enable command is connected to the decade counters 109 and 108 via OR gate 111.

The purpose of storing the eight bits in a latch before transferring them to the counter is so that the bits are ready to be moved out of the latch and into the counters at the moment a carry out is produced by the tens counter. In this way one set of eight bits can be stored and waiting in the latch while the counter is processing the countdown of the previous eight bit number.

In operation, the two stages of decade counters may store any number between zero and 99. Assuming, for example, that a number 37 represents the number of time increments required for the pulse delay, the digit 7 is stored in counter stage 108, which is the units stage, and the digit 3 is stored in stage 109, which is the tens stage. At the receipt of a start signal from the output of AND gate 107, the counter starts to run backwards, driven by clock CK. After receipt of 7 clock pulses, the counter stage 108 will be down to its zero count and produces a carryout pulse which is applied via line 117 to the tens counter stage 109 and drives that stage down one step from 3 to 2. After receipt of another ten clock pulses, the units counter stage 108 again produces a carry-out pulse which drives tens counter stage 109 from 2 to 1. After receipt of another ten clock pulses, the tens counter stage 109 produces a high on its own carry-out lead 116 which drives the output lead 104 high and activates the next stage, the extension stage 18, or is connected directly to the amplifier section 8 via leads 13 (FIG. 1).

The carry-out pulse on lead 116 also operates to transfer the next eight bits that in the meantime have been stored in the eight bit latch 112. This is done through the upper input to OR gate 111. Additionally, the carry-out pulse on lead 116 operates to clear the latch 105 via the right hand input to OR gate 106, combined with a low on its left hand input from AND gate 91.

Figure 7:
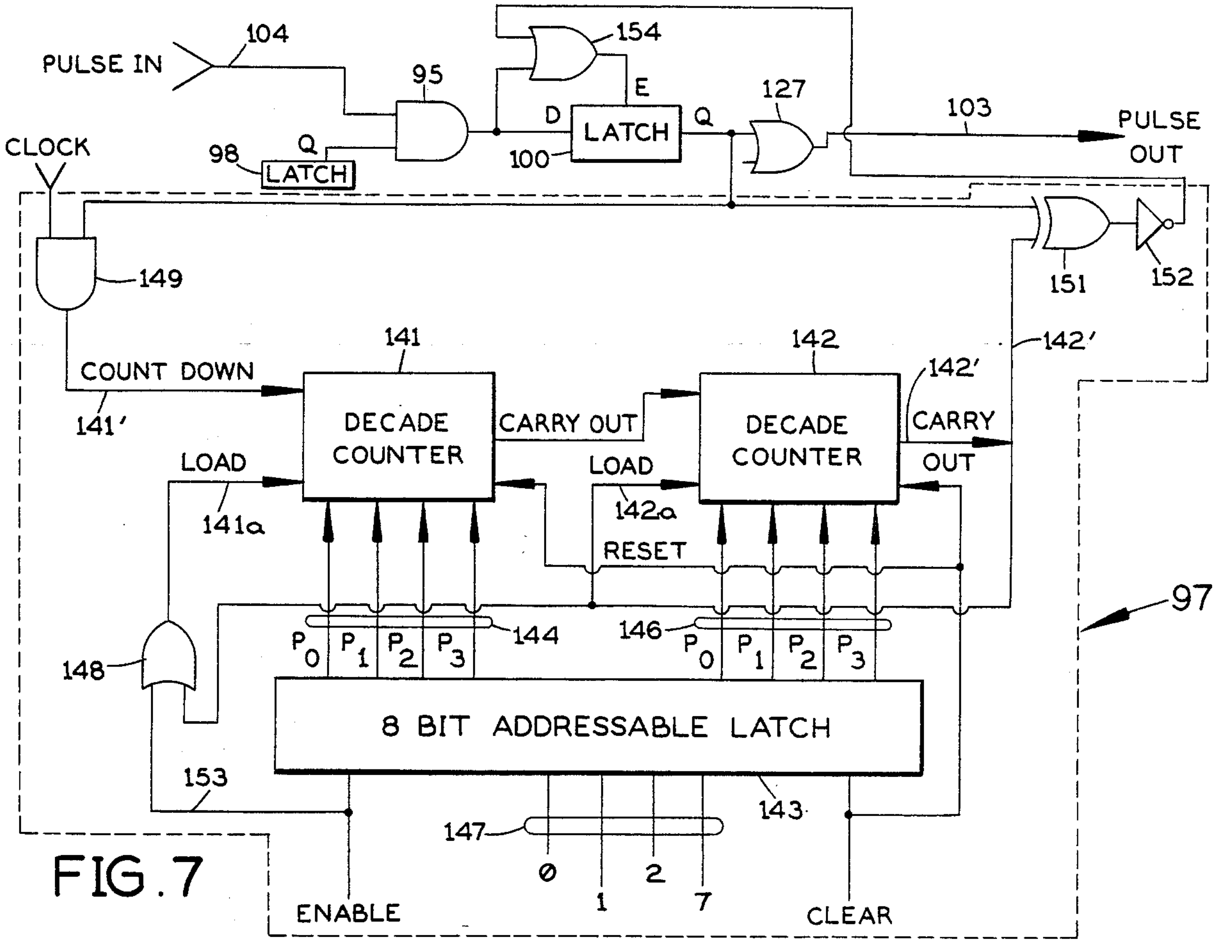
FIG. 7 is an abbreviated logic diagram of the pulse extension section of the system.

FIG. 7 is a more detailed circuit diagram of the counting part of the pulse extension section 18 of the pulse modifiers 7 (FIGS. 1 and 6).

As in FIG. 5, a pulse enters the extension circuit on lead 104. If the pulse is to be delayed, latch 98 will be set initially by the CPU, which will place a high on the lower input to AND gate 95, which will in turn set latch 100 The output Q of latch 100 places a high on output lead 103 through OR gate 127. At the same time, the counter 97, which in FIG. 7 has two cascade connected decade counters 141 and 142, is loaded, each with a four bit number, from the eight bit addressable latch 143. The eight bit latch 143 is at that time already loaded with an eight bit number from the CPU 4 over eight input leads 147, which are part of the bus 16 in FIG. 1. The transfer of the eight bits from latch 143 to decade counters 141 and 142 is done under control of the "carry out" lead 142' from decade counter 142, which is connected to the "load" input leads 141*a* and 142*a* of the two decade counters.

At the moment of the arrival of the pulse on lead 104 when latch 100 was set, this latch from its output Q enables the right hand input to AND gate 149, which admits the clock signal via line 141' to start the count-down operation of the two decade counters 141 and 142 which takes place in a manner completely analogous to the count-down of the decade counters explained above for FIG. 8. When the two-digit number stored in decade counters 141 and 142, and which represents the delay to be effected, has been counted down to zero, a carry-out is produced from decade counter stage 142 on lead 142' which causes the transfer of the next eight bit number that in the meantime has been stored in the eight bit latch 143.

An exclusive OR gate 151 is used to clear the latch 100 at the end of the count-down. An exclusive OR gate is a logic element that produces a high output when one of its inputs is high but a low output if both inputs are high. In this case, the upper input to the exclusive OR gate 151 is already high from the output from latch 100. At the moment the carry-out goes high, the lower input to the exclusive OR gate 151 also goes high, and its output goes low. This low output is inverted to a high in the inverting gate 152, which sets the upper input to OR gate 154 high. This, in turn, sets the enable input E to latch 100 high. At this time, the input D (data) to latch 100 is low from the low output from AND gate 95, and as a result the latch 100 is set low, which is the same as clearing it. The output from AND gate 95 is low because its upper input 104 is now low since the input pulse has elapsed. The clearing of latch 100 terminates the extended output pulse on lead 103.

It follows that it is possible to program in advance the duration of the extended output pulse by preselecting the values of the two numbers stored in the two decade counters 141 and 142 from the memory 11. It also follows that these numbers may be computed by the CPU 4 if such has merit as a mission objective.

The pulse modifier section 7 (FIG. 1) will normally consist of a plurality of the combined elements Extend (18), Delay (19) and Fixed (21). There are as many of these combinations as will be required in order to serve the radio transmitters and receivers onboard the aircraft.

The output pulse on lead 103 which, as explained in detail above, may be the unchanged initial pulse arriving on lead 102 or may have been modified by being delayed and/or extended, is next connected via lead 13 to an input of one of the amplifiers 22 of section 8 in FIG. 1. These amplifiers serve to adjust the pulse arriving on lead 13 to an output level on lead 14 that is suitable for the blanking input lead of the radio receiver to which it is connected.

The amplifiers 22 consist typically of one or more of the so-called linear amplifiers now used widely in connection with digital circuits. Each amplifier comprises components that serve to provide the proper amount of gain from input lead 13 to output lead 14.

The gain network may, if merited, include digitally controllable components so that the gain may be controlled by digital, binary encoded commands over bus 17 of FIG. 1. A more detailed operation of the amplifier logic is shown under the description of the second embodiment and on FIG. 17.

FIG. 3 shows a block diagram of the control software with its major functional blocks. The software consists of the control programs that operate the entire blanking system and consists basically of listings of instructions for the control processing unit (CPU) encoded in binary numbers and stored in the memory. The software is, in order to be manageable, partitioned into smaller sections or modules, of which the major ones are shown in FIG. 3. A control program module 52 serves to combine all other lower level modules into a single operating control program. It receives input from the multiplex bus interface module 51 and the pilot command processing module 53. The control program in turn activates the flight profile algorithms 55, the look-through algorithms 56 and the threat algorithms 57 which all contain step-by-step instructions for all the aircraft procedures to be followed under different combat missions.

A blanking configuration generator 58 receives the appropriate algorithms for the particular mission and combat situation and produces the number tables and other information needed by the blanking system. These consist of the pulse extension numbers 62, the matrix loading information 61, the pulse delay number 63 and the output voltage control information 64, and optionally the input impedance matching module 161 of FIG. 2.

The software also contains self test procedures to insure that the blanking system operates as required, and consist of test programs 59, configuration test 65, which is linked to the blanking configuration generator 58, and an end-to-end test module 66.

The invention has in its first embodiment been described in detail above in relation to its application aboard a military aircraft. It should be understood, however, that the invention may be used to advantage in connection with radio systems used with complex clustered radio installations comprising radio transmitters and receivers as they are used aboard seagoing craft, as well as land based radio installations. Also the application need not be limited to military use but may be used also in commercial installations where many transmitters and receivers are clustered and may initially interfere with each other.

The invention may also be constructed in a second embodiment as described in detail below.

SECOND EMBODIMENT

The design goal for a programmable blanker in the second as well as the first embodiment is the ability to change the configuration of the blanker using software changes instead of hardware changes. The configuration change of the blanking system must include all stages of operation such as input conditioning, matrix configuration, pulse conditioning and output conditioning. The elements of the second embodiment which are numbered in the 200 s have the same last two digits as the two digits of the elements of the first embodiment to avoid repetitious description. The input conditioning involves the ability to accept either a low voltage input, 4.8 V to 13 V, or a high voltage input, 15 V to 70 V peak. Under program control each input will be configured for a low or high voltage input.

An input pulse from the transmitter to the blanking system goes to the first stage called the signal conditioner 5 of FIG. 1. This stage performs two main functions: translating the various input voltages to TTL logic levels which are required for the matrix circuitry, and providing the necessary terminating impedance to the incoming pulse. The circuit must also be capable of meeting the input trigger levels for low or high voltage input.

As shown in FIG. 9, to program for a low voltage input, the D latch is loaded so that Q is 1 and $\overline{Q}$ is 0, causing transistor Q1 to be on and Q2 to be off. Therefore, the impedance of the network is equal to the parallel combination of the 120 ohm resistor 302 and resistor 304 which, with the resistor values shown is approximately equal to 100 ohms, and with a nominal input voltage of 7 V, an output voltage of generally 3.5 V is produced due to the clamping by diode 308. At the upper limit of 13 V, the output is 4.6 V and at the lower limit of 4.8 V, the output is 2.4 V. Also with an input less than 1.6 V, the output voltage is less than 0.8 V. Since the matrix circuitry is based on TTL, an input voltage 2.4 V to 4.6 V is considered a 1 and voltage less than 0.8 V is considered an 0.

To program for a high voltage input, the D latch is loaded so that Q is 0 and $\overline{Q}$ is 1, with the result that Q1 is off and Q2 is on. Therefore, the impedance of the network is 320 ohms and with a nominal input voltage of 25 V an output voltage of 3.77 V is produced. At the upper limit of 70 V, the output is 4.6 V and at the lower limit of 15 V, the output is 2.26 V. Also, with an input less than 5 V, the output is less than 0.8 V.

FIG. 9 also shows the interface to the microprocessor (CPU) and one of the latches 301. The data line, ZM, is one of the data lines from the CPU and is a common bus to all latches 301. The load enable lines, "LOAD EN", are outputs of a decoder (not shown) which is also driven by the data lines from the CPU. Under program control the CPU will fetch the data from memory and then load that information into the latch. The program will fetch data and load 24 times for 24 latches.

In the second embodiment of this invention, the matrix may, for example, have 24 inputs and 24 outputs and 576 crosspoints between these inputs and outputs. FIG. 10 illustrates a small part of such a matrix, with two inputs 271 and 272, two outputs 273 and 274, and a link 285 at each of the four crosspoints between these two inputs and outputs. Each link 285 is an open collector NAND gate having one input 287 from the corresponding input line of the matrix (in this instance, line 271 or 272). The output of each crosspoint NAND gate 285 is connected to a corresponding output of the matrix (e.g., 273 or 274).

A second input 288 to each NAND gate 285 is from a corresponding output of an eight-bit addressable latch 401. For a 24×24 matrix, 72 such latches will be provided, each having eight outputs, each of which is connected to a corresponding NAND gate 285. In the partial matrix shown in FIG. 10 the left-hand latch 401-1 is shown with two outputs connected to respective NAND gates 285 which have inputs on line 272. However, it will be understood that this latch has six more outputs, each connected to a corresponding NAND gate 285 which has an input on line 272. Thus, the single 8 bit addressable latch 401-1 will have its eight separate outputs connected individually to all of the NAND gates 285 associated with input line 272.

Similarly, the other latch 401-2 has its eight outputs connected individually to all of the NAND gates 285 associated with input line 271, although only two such outputs are shown in the partial matrix of FIG. 10.

The gates are enabled or disabled by programming the 8-Bit addressable latches 401 with 1's or 0's respectively. The data to the latch is supplied from the 8-Bit CPU bus 16 from the CPU 4. The CPU under program control can load the 8-Bit latches 401 with data from memory 11. The memory 11 will contain all the data for each of the 72 latches. All the latches will share the same data bus, and the CPU under program control will fetch data from memory and when data is on the bus, the CPU will generate a load pulse to the corresponding latch. Each latch will have a separate load line, therefore the CPU will load each latch with the appropriate data from memory. The load signal will be generated by a decoder controlled by the CPU.

A high signal level 1 on the load line will store the data into the latch. After the latch is loaded the load line will go low (level 0) and remain low until the data in the latch must be changed. Therefore, each one of the 72 latches will be loaded individually with the data in memory. The latches will be loaded after power is applied and they will remain in a static state unless reconfiguration of the matrix is required.

Taking latch 401-1 as an example, this latch has a single row enable input terminal E and eight column data input lines C1, C2, C3, C4, C5, C6, C7 and C8.

The single row enable input terminal E for latch 401-1 extends from one output terminal of a decoder 276, which has eight input lines carrying the eight bits of the word which specifies the row address. In the case of a 24×24 switching matrix with 72 latches 401, three of those latches will control the 24 NAND gates 285 connected to a single row of the matrix. For example, latch 401-1 will control 8 of the NAND gates 285 connected to row 2, another latch (not shown) will control the next 8 NAND gates 285 connected to row 2, and still another latch (not shown) will control the remaining 8 NAND gates 285 which are connected to row 2. The decoder 276 has 24 separate output lines, each of which is connected to the row enable input terminals of the 3 latches 401 which control the 24 NAND gates 285 connected to a particular row of the matrix. For example, the output line from decoder 276 which is connected to the row enable input terminal E of latch 401-1 also is connected to the row enable input terminal of each of the other two latches associated with row 1 of the switching matrix.

The column data input lines C1–C8 carry the eight bits of the word which specifies the column address. These column data input lines are connected to all of the latches 401 (72 in all for a 24×24 matrix).

With this arrangement, each of the 72 latches 401 is under the joint control of the signal level on its single row enable input terminal E and the signal levels on its eight column data input lines C1–C8. For any combination of row and column data supplied from the CPU 4, only one of the 72 latches 401 at a time will be actuated, and this actuated latch will enable one of the eight NAND gates 285 which it controls, so that one of the 24 rows of the matrix will be connected to one of the 24 columns through this NAND gate 285 at the crosspoint between them.

Figure 11:
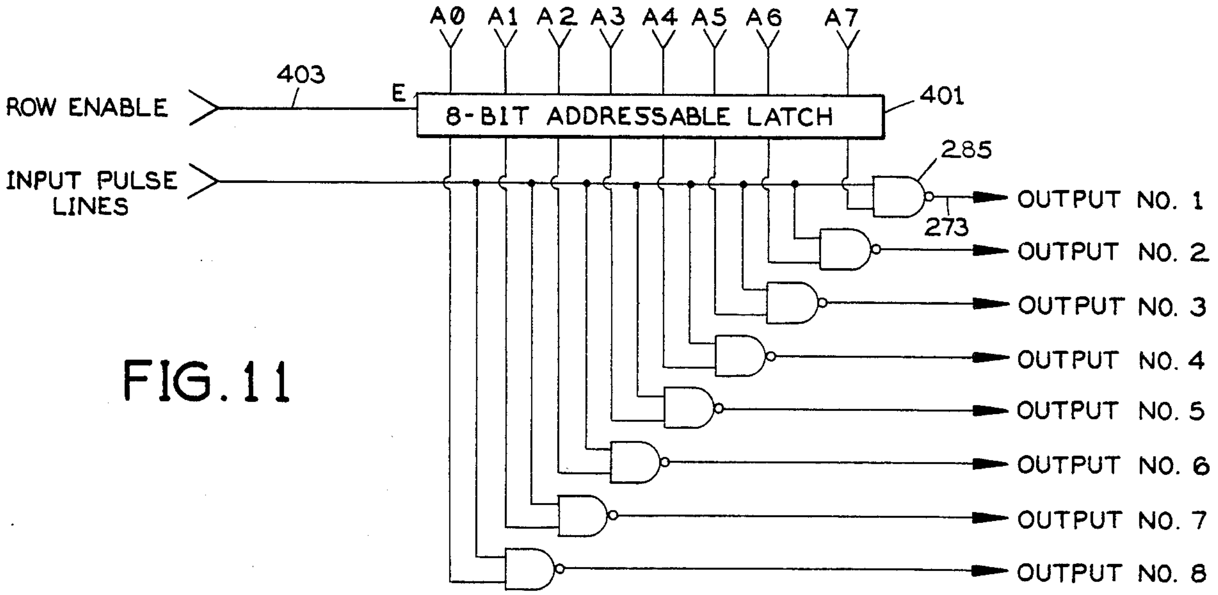
FIG. 11 is an abbreviated logic diagram of a 1×8 matrix section.
Figure 12:
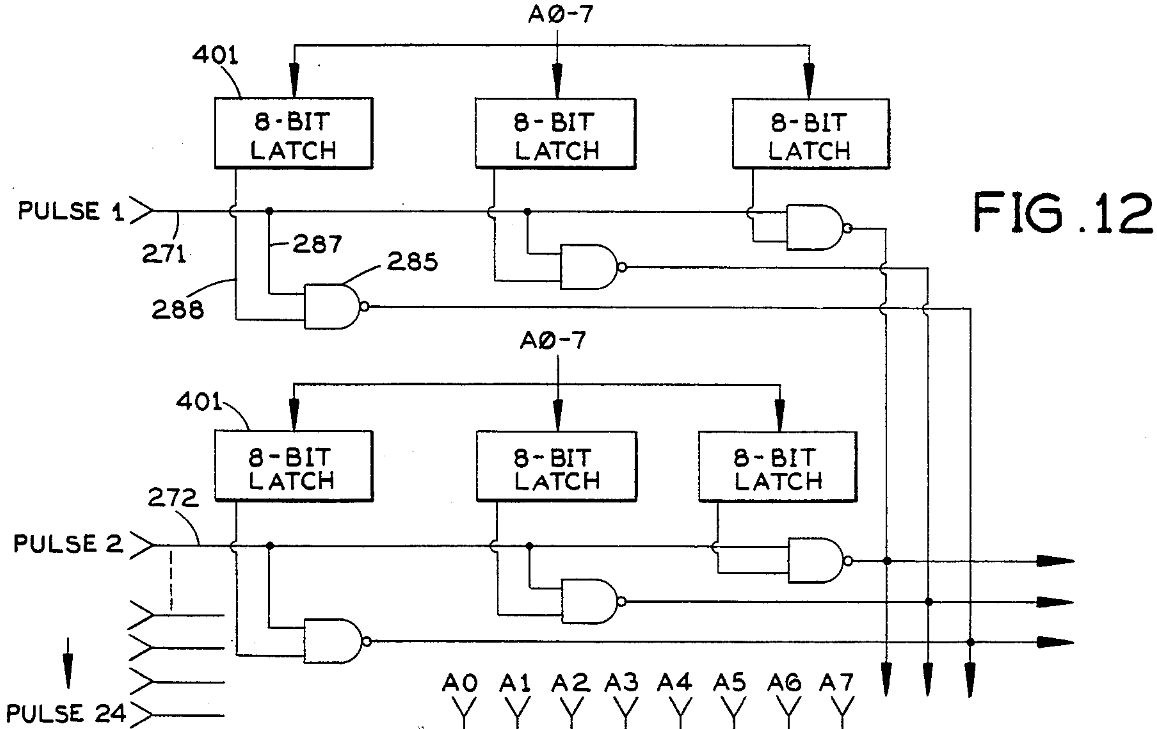
FIG. 12 is an abbreviated logic diagram of a section of the 24×24 matrix of the second embodiment showing association between matrix links and column address registers.

Three sections of FIG. 11 each having 8 outputs 273 are required to provide 24 outputs. The register inputs will share the same data bus and the input line will be common to the 24 gates, as shown in FIG. 12. This is repeated 24 times to provide for each input. The common outputs from each input are wired OR'ed together by connecting the open collector outputs of the tri-state NAND gates, so that all the number 1 outputs are common, all the number 2 outputs are common, etc.

PULSE CONDITIONING

All 24 outputs from FIG. 12 go to the next stage of the blanking system. This stage is the pulse conditioning circuit. As explained under the first embodiment, the pulse conditioner has three modes, leading edge subtraction (Pulse delay), trailing edge stretch (Pulse extension) and a fixed output pulse width. Leading edge substraction and trailing edge stretch will also be referred to as delay and extension respectively.

Each matrix output 273,274 has its own pulse conditioning circuit. Each pulse conditioning circuit is programmable for several combinations of the three modes of operation, such as the delay/no extension or no delay/extension or delay/extension or fixed pulse. The pulse conditioning circuit consists of two separate circuits, the delay and the extension/fixed circuits.

Figure 13:
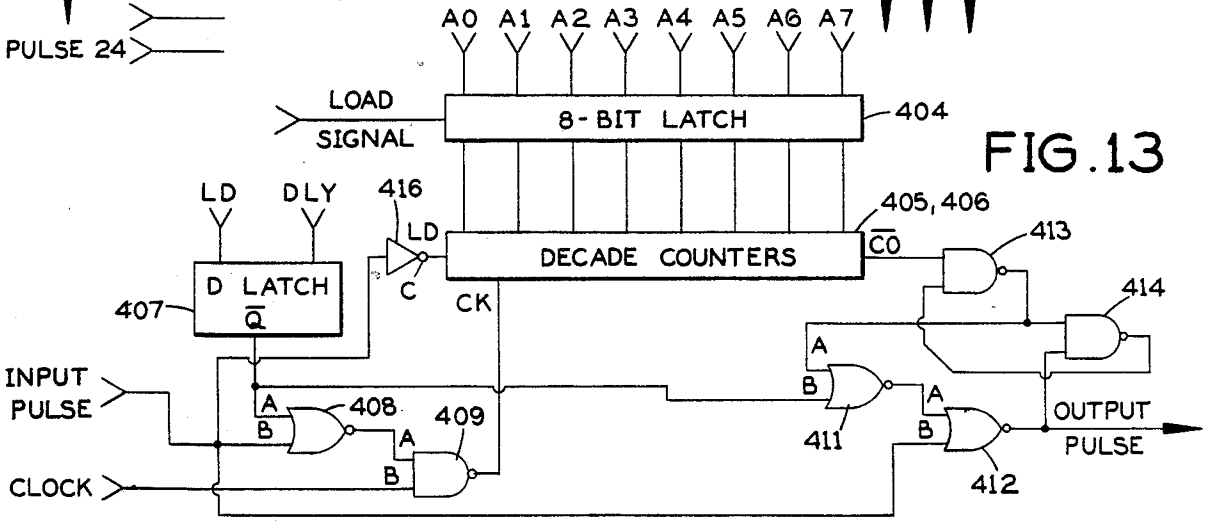
FIG. 13 is a logic diagram of the leading edge subtraction (delay) logic of the second embodiment.

The delay circuit of the second embodiment is shown in FIG. 13. The delay time is programmable and can be selected within a range of 1–99 times the clock period. The clock frequency can also be pre-programmed for the desired clock period. For example, with a 10 mHz clock, the delay time range is 100 ns to 9900 ns; with a 1 mHz clock, the range is 1 μsec. to 99 μsec. Therefore, the time it takes for the counters to reach zero from a preset value is the time of the total delay.

The delay time is programmed by loading two decade counters from an 8-Bit latch which is preloaded by the microprocessor on initialization similar to the loading of the matrix addressable latches.The D latch 407 is also loaded so that $\overline{Q}$ output is low. Since the matrix links 285 are NAND gates, therefore inverting, a matrix output pulse, which is the same as the input pulse to the pulse conditioning circuit on FIG. 13, is low, it follows that with no input pulse, gate 412 pins A and B are 1's and the output is 0. Also the counters are held in a load state from gate 416 and the clock to the counters is low and disabled since gate 409 output is low when gate 408 output is high.

Figure 14:
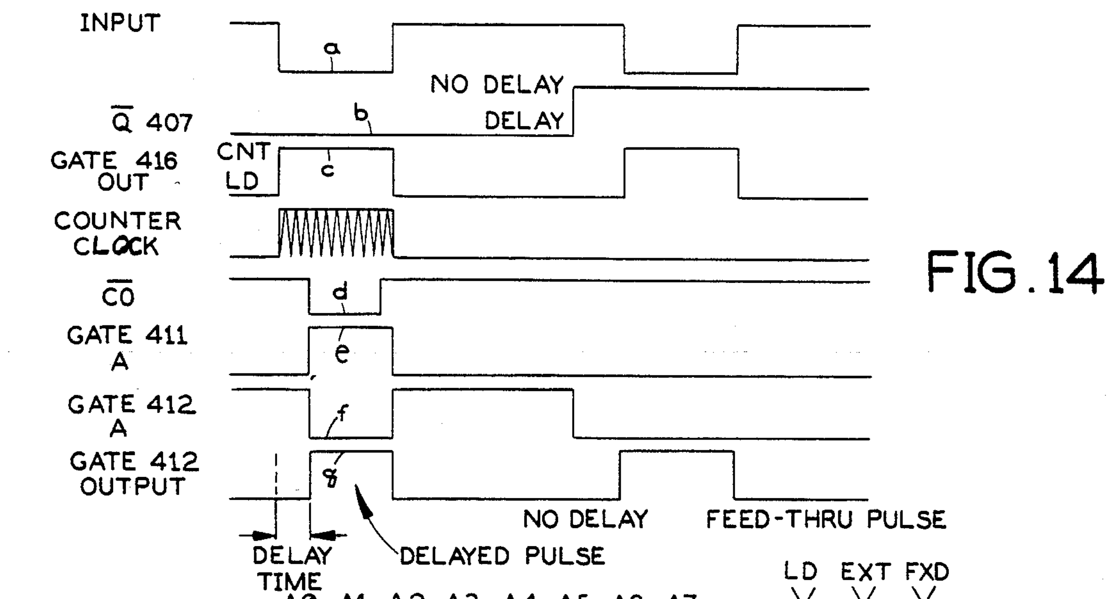
FIG. 14 is a pulse timing chart for the delay circuit of the second embodiment.

FIG. 14 shows a timing chart for the delay circuit of FIG. 13. The input pulse a is low. $\overline{Q}$ shows the output from the D latch 407 as low at b when loaded. Gate 416, output $\overline{C}$ is high when the input is low. The counter 405 output $\overline{CO}$ is low when the counter is loaded at d. The input A to gate 411 goes high at e when the S-R latch gate 413 output goes high. Gate 412 pin A goes low at f, and its output at g goes high.

Where there is an input pulse, gate 412 pin B goes low and pin A is high and the output is low. Also at that time, the counter changes from a load mode to a count mode from gate 416 and the clock to the counter is enabled since gate 407 is ON when gate 408 output is high. The counters are set in a count down mode and when the count reaches zero, there is a negative pulse at $\overline{CO}$ output, which causes the S-R latch formed by gates 413 and 414 to be set and gate 411 pin A goes to high. Gate 412 pin A goes to 0 and the output of gate 412 goes to 1. When the input goes high again, the output of gate 412 goes to 0, resets the S-R latch, the clock is disabled and the counters are returned to a load mode.

Therefore, the counters are reloaded with new data from the 8-Bit latch in between input pulses, and the 8-Bit register and D latch are loaded during initialization of the system.

No delay is accomplished by loading the D latch so that $\overline{Q}$ output is high. Since $\overline{Q}$ is high, gate 412 pin A is low, and the gate is enabled so that an output is provided whenever there is an input pulse. Also the clock to the counter is disabled and the counter is inactive except for loading data when there is no input pulse.

Figure 15:
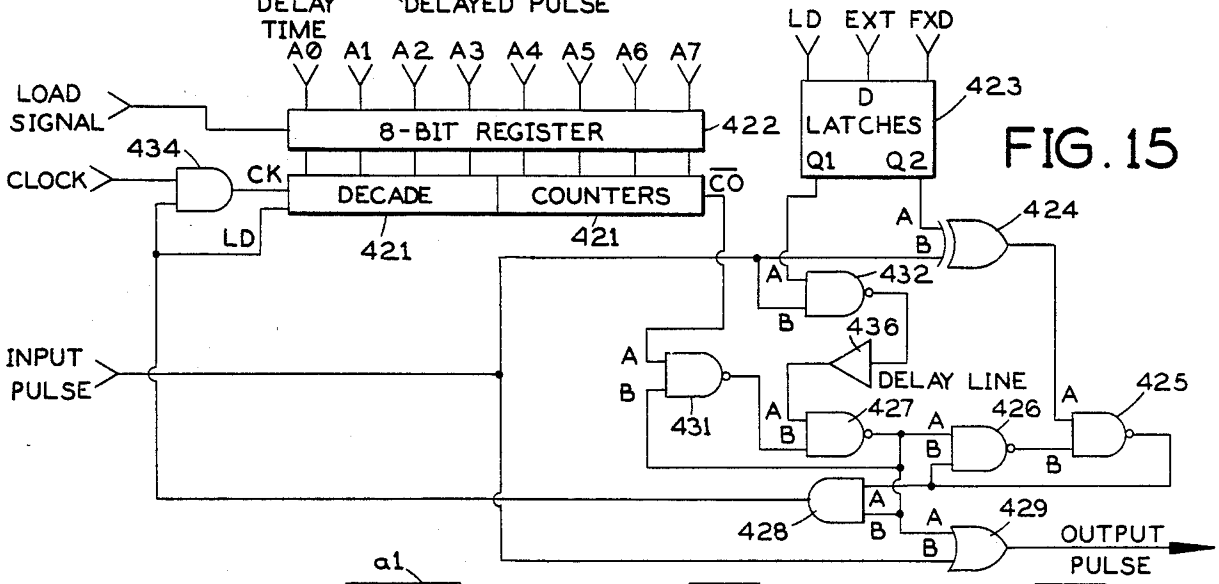
FIG. 15 is a logic diagram of the pulse extension logic of the second embodiment.

The extension/fixed circuit shown in FIG. 15, comprises the other half of the pulse condition circuit. The extension time or fixed pulse width is programmable and it can be selected within a range of 1–99 times the clock period. The clock frequency can also be pre-programmed for the desired period similar to that of the delay function. Therefore, the time it takes for the counters to reach zero from a preset value is the resulting time of the extension or the length of the fixed pulse width.

The extension mode is selected by loading the D latches 423 so that Q1 is high and Q2 is low. The fixed pulse mode is selected by loading the D latches so that Q1 and Q2 are both high. No extension and no fixed pulse is selected by loading the latches so that Q1 and Q2 are both low (feed thru mode).

In FIG. 15, which shows the pulse extension logic diagram, the extension mode, the extension time is programmed by loading two decade counters 421 from 8-Bit latch 422 which is preloaded initially to a fixed value during initialization similar to the loading of the register latches for the matrix. Also in this case, the D latches 423 are programmed so that Q1 is high and Q2 is low.

Figure 16:
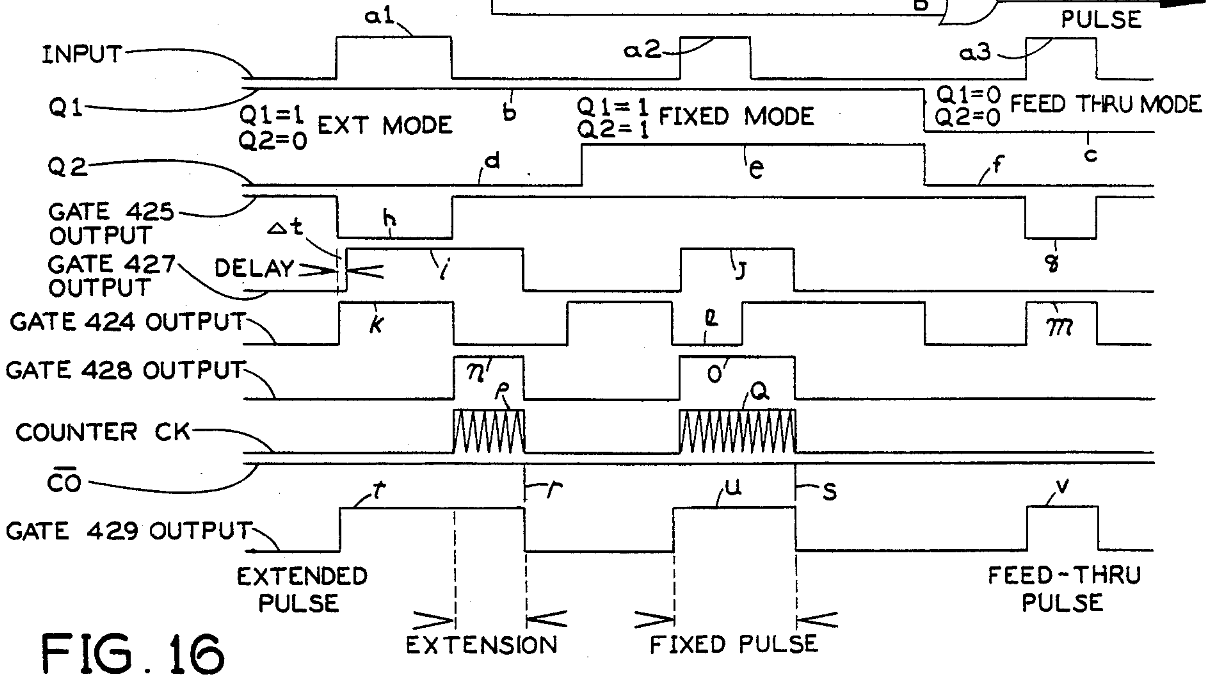
FIG. 16 is a timing chart for the pulse variable/fixed extension circuit.

With no input pulse, in FIG. 15 gate 429 pins A and B are low and the output is low. Gate 428 output is low which disables the clock to the counter through gate 434 and also holds the counters pin LD low in a load state. Gates 426 and 425 outputs are high since the exclusive OR gate 424 output is low and the S-R latch of gates 431 and 427 is reset so that gate 427 output is low. FIG. 16 shows the timing chart for the extension/fixed circuit.

In FIGS. 15 and 16 where there is an input pulse, OR gate 429 also produces high output pulse a. The output of exclusive OR gate 424 becomes high and the S-R latch of gates 426 and 425 becomes reset so that gate 425 output goes low. Also the S-R latch of gates 431 and 427 is set so that the gate output of 427 goes high. However, gate 427's output must be delayed long enough so that gate 428 is disabled. This is done by adding some delay in between gate 432 and gate 427 by means of delay line 436. At the end of the input pulse, gate 429 pin A is high and pin B is low, and the output is still high. Next the S-R latch of gates 426 and 425 is set so that the gate 425 output is high. Gate 428 output is set high, the clock is enabled and the counters are set in the count mode, as a result of LD to counter 421 going high. The clock drives the counter backward.

When the count reaches zero, there is a negative pulse at output $\overline{CO}$. The S-R latch of gates 431 and 427 is reset so that gate 427 output goes low. As a result, the output of gate 429 goes low since pins A and B are both low. Gate 428 output goes low and the clock is disabled and the counters are reloaded.

In the fixed pulse mode, D latches 423 are programmed so that Q1 and Q2 are both high and the pulse width length is programmed into the 8-Bit register 422 initially. With no input pulse, the outputs of gates 424 and 425 are high. When there is an input pulse, gate 424 output goes low and gate 425 output remains high. The S-R latch of gates 431 and 427 is set and gate 428 output goes high. The clock is enabled and the counters are set to the count mode. If the input pulse again goes low and stays low before the count reaches zero, then a fixed pulse is produced. However, if the input pulse again goes high before the count reaches zero, the counters will continue and an extended pulse is produced. If the input pulse re-occurs and it is high when the count reaches zero, an extended pulse is also produced. The output of gate 429 goes low only when the input pulse is low and the counter output $\overline{CO}$ goes low so that the S-R latch of gates 431 and 427 can be reset.

In the feed-thru mode, D latches 423 are programmed so that Q1 and Q2 are both low. The output of gate 432 stays high all the time and the S-R 431 and 427 latch is always reset. The clock is disabled and the counter is inactive. When there is an input pulse, an output pulse is always produced with no extension through gate 429.

The circuits of FIGS. 13 and 15 are connected in series so that the low output pulse from the matrix is connected to the input of the delay circuit FIG. 13 and the output pulse from the delay circuit is connected to the input of the extension/circuit FIG. 15. The output pulse from the circuits FIGS. 13 and 15 produce the overall pulse conditioning. The outputs from the 24 pulse conditioning circuits go to the next stage of the blanker, the output amplifier circuit.

FIG. 16 is a timing chart of the extension circuit of FIG. 15. At the pulse input, a1, 2 and 3, is an input pulse going high. The lines Q1 and Q2 show outputs of D latches 423 Q1 and Q2, first at b in the mode where Q1 is high and low at c and Q2 is low at d, high at e and low again at f. The time d when Q1 is high and Q2 is low is the extension mode. The time e when both are high is the fixed mode and the time c and f when both are low is the feed-through mode. The output of gate 425 goes low during the input pulse a1 in extension mode at h, stays high during the time of the input pulse a2 in the fixed mode and goes low at g during the input pulse a3 in the feed-through mode. The output of gate 427 in the extension mode, which is delayed a short time Δt from the leading edge of the output h of gate 425. The output of gate 427 during the fixed mode is shown at j. The output of gate 424 during the extension mode, shown at k is nearly identical to the input pulse a1, and nearly identical to the input pulse a3 during the fixed mode at m. The output of gate 428 which represents the extension time is shown as n in the extension mode and O in the fixed mode. The input CK to the counter 421 in the extension mode is shown at p and at q in the fixed mode. The output $\overline{CO}$ from the counter 421 at the end of the count is shown at r in the extension mode and as s in the fixed mode. The output pulse from gate 429 which is the modified output pulse is shown as the extended pulse at t, the fixed pulse at u and the feed-through pulse at v.

OUTPUT AMPLIFIER

Figure 17:
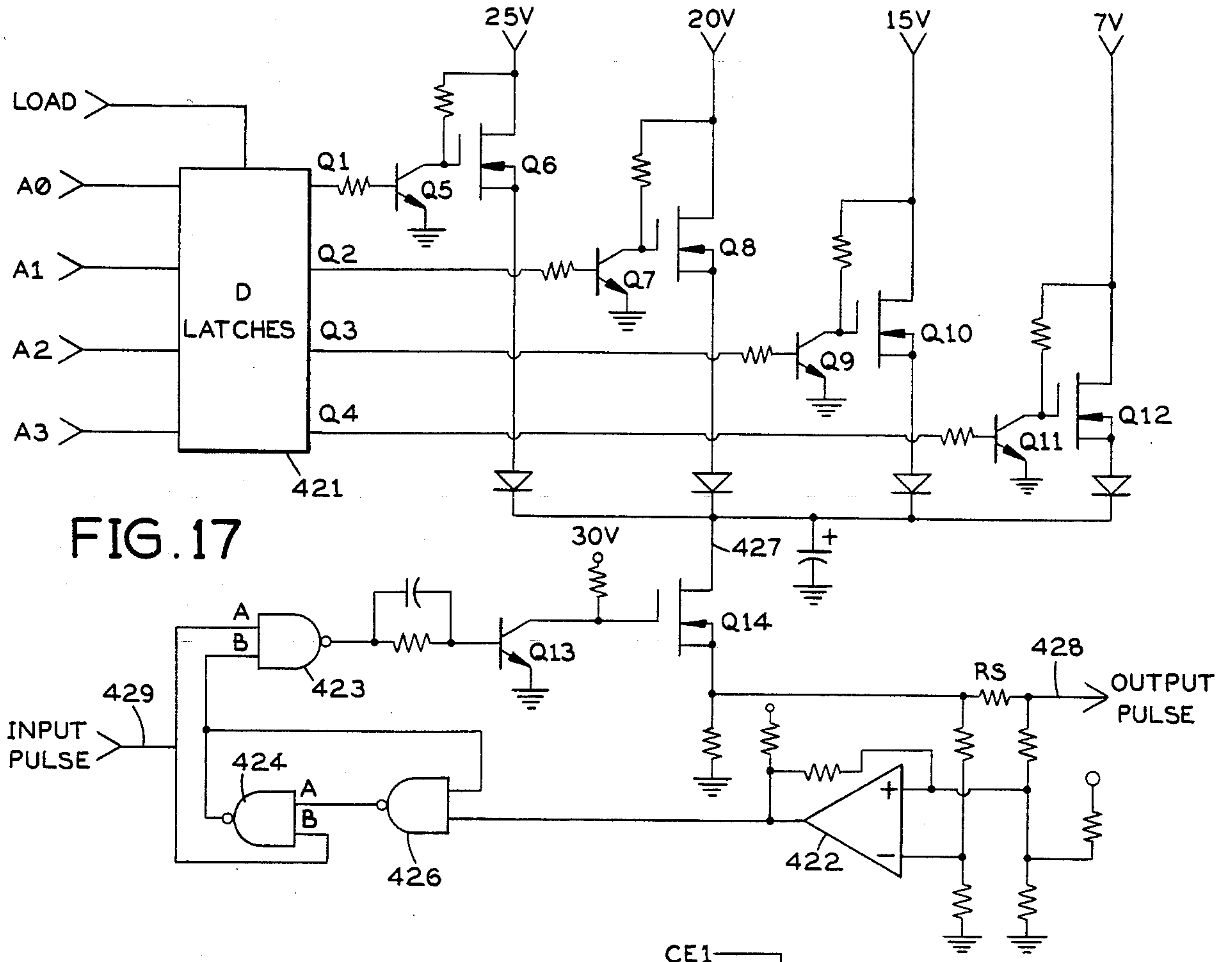
FIG. 17 is a circuit diagram of the output pulse amplifier logic, used in both first and second embodiments.

The amplifier circuit shown as a circuit diagram in FIG. 17 is the final stage of the blanker. At this point, the pulse is configured to the appropriate voltage amplitude which is required by the receiver connected to the outputs of the blanker. The voltage amplitude is selected from 4 positive voltage supplies, typically 7 V, 15 V, 20 V and 25 V. One standard amplifier module using VMOS field effect transistor (Q14) as the output source has been designed to accommodate the wide supply range and still meet most of the pulse characteristics for the low and high voltage outputs. Each amplifier also has a shutdown circuit which is activated when the output is shorted.

The output voltage level is programmed by loading the D latches 421 so that if 7 V is required, the output Q4 is low, and Q1, 2 and 3 outputs are high. A high at Q1 turns on the drive transistor Q5 and shorts the gate of the FET Q6 to ground, thereby turning off Q6. A low at Q4 turns off Q11, and a gate voltage of 7 V turns on Q12. Similarly any one voltage is selected by programming the corresponding Q output low and the other 3Q outputs high. The 24 latches for each output are programmed during initialization similar to the loading of the registers for the matrix.

The amplifier 422 is driven from a NAND gate 423. The output of gate 423 drives a fast switching transistor Q13, which turns on Q14. The gate voltage of Q14 is referenced higher than the voltage source voltage at 427. When Q13 turns off as the output of gate 423 goes low, the collector voltage of Q13 turns on the source of Q14. The rise, fall and delay times on the output are all dependent on the voltage rise of the gate.

In case of an accidental short circuit on the output pulse lead 428 a shutdown circuit consisting of a comparator 422 sense resistor RS and S-R latch consisting of gates 424 and 426. When the output is shorted, the voltage across the sense resistor RS increases to a preset value which triggers the output of the comparator 422 to reset the S-R latch so that gate 423 pin B goes low. The input pulse on 429 is then disabled and the amplifier is turned off. When the input pulse on 429 goes low, the S-R latch is again set and gate 423 is again enabled.

Figure 18:
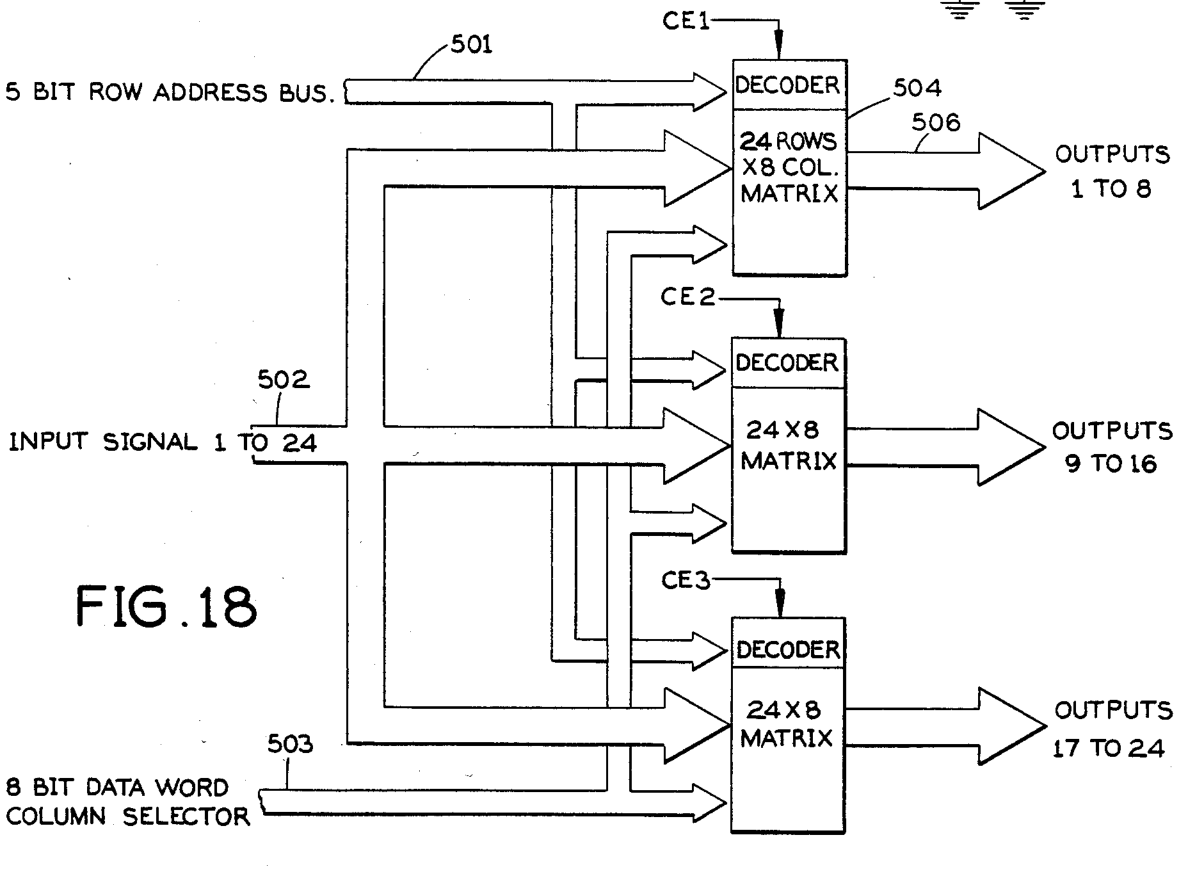
FIG. 18 is a block diagram of the data flow of the 24×24 programmable matrix of the second embodiment.

FIG. 18 is a flow diagram of the flow of data and signals through the programmable blanking system, as described in detail above. Row address bus data enters at bus 501, blanking signals enter at bus 502 and column address bus data enters at bus 503, all to be gated through the matrix sections 504 to the pulse conditioning circuits via busses 506.

MICROPROCESSOR PROGRAM DESCRIPTION, GENERAL

The Programmable Blanker internal microprocessor provides the means to communicate digitally with the aircrafts system bus and to control the interference blanking circuitry as required by mission and/or flight profile to the proper Input/Output channel matrix section, pulse conditioning and output pulse voltage level. Self test programs will be performed upon power initialization, after configuration generation and periodically during flight operations.

Program control of Read Only Memory shut down in between multiplexor bus change commands will be used to reduce thermal dissipation.

When initial power is applied to the blanking system the microprocessor START-UP program initializes the blanker logic, and memory, and sets all the output channels to the no output mode.

After the power-on Start Up mode is completed, the blanker begins its Self Test mode of operation. A checksum test is performed to confirm proper operation of most of a read-only memory. After this test, the microprocessor does various tests on its random-access memory to assure proper operation.

The Output Channel Test mode checks all the blanker channels for all combinations of the input/output signal matrix. The microprocessor generates simulated input pulses and then tests the transmission of this signal to all the blanker output channels. This operation is performed for all combinations of the 24×24 input/out channel matrix within the blanker.

The next self test checks the blanker interface transceiver circuitry. This test is generally known as a "wrap-around" self-test. The microprocessor sends data to the data transmitter circuitry. The protocol logic circuitry prevents the data from actually being transmitted and instead "wraps" the data back around to the receiver. The data from the receiver is then compared for validity and word count to confirm proper operation of the transmitter/receiver (transceiver) circuitry. Error results of this test are also later transmitted to the system controller.

The last function performed by the microprocessor after start up is the matrix input/output channel initialization. Each input channel is routed to its required output channel. Also, a predetermined pulse extension and/or delay may be programmed for each output channel. The matrix, pulse extensions and pulse delays may be modified as required either by ground control crews or in flight by the aircraft system controller, depending on the aircraft mission requirements.

The remainder of the time after original system test, checkout, and blanking configuration initialization is spent by responding to the aircraft system controller for input messages, transmission messages, and continuous self testing.

We claim:

1. In combination with a plurality of RF transmitters and receivers in sufficient proximity to said transmitters for deleterious signal interference among them to be possible, an improved blanking system for rendering said receivers non-receptive to said transmitters, said system comprising:

blanking circuit means having output connections to said receivers for delivering signals to said receivers rendering them temporarily non-receptive to signals from said transmitters and having a plurality of respective inputs from said transmitters to receive pulses therefrom, said blanking circuit means comprising a digitally controlled switching matrix;

and a central processor operatively connected to said blanking circuit means to control the delivery of pulses from said transmitters to said receivers in accordance with variable input signals received by said processor, said central processor addressing said matrix in accordance with input signals received by said processor.

2. A system according to claim 1, and further comprising digitally controlled pulse modifying circuit means operatively connected between the ouput of said matrix and said receivers to modify the pulses received by the latter from said matrix, said central processor being operatively connected to said pulse modifying circuit means to address said pulse modifying circuit means in accordance with input signals received by said processor.

3. A system according to claim 2 wherein said pulse modifying circuit means includes means for selectively delaying the delivery of certain pulses from said matrix to corresponding receivers.

4. A system according to claim 2 wherein said pulse modifying circuit means includes means for selectively extending the duration of certain pulses delivered from said matrix to corresponding receivers.

5. A system according to claim 4 wherein said pulse modifying circuit means also includes means for selectively delaying the delivery of certain of said pulses from said matrix to corresponding receivers.

6. A system according to claim 1 for use on an aircraft having receivers for receiving threat radar signals and receivers for receiving terrain-following information signals, wherein said central processor is operatively arranged to receive input signals from said threat radar receivers and said terrain-following receivers and includes a control program module containing terrain-following algorithms and threat algorithms to address said matrix according to said algorithms and said input signals from said receivers.

7. A system according to claim 5 wherein said means for delaying the delivery of pulses from said matrix to receivers comprises means in central signal processor for producing digitally encoded signals which digitally control said pulses.

8. A system according to claim 1 wherein said central processor further comprises memory means for storing digitally encoded control programs.

9. A system according to claim 8 wherein said central processor further comprises a bus interface communicating with an aircraft multiplex bus.

10. A system according to claim 9 wherein said central processor further comprises a central processing unit operatively communicating with said matrix and with said pulse modifying circuit means.

11. A system according to claim 8 wherein said memory means for storing control programs comprises program modules for testing said improved blanking system.

12. A system according to claim 1, wherein:

said matrix comprises a plurality of rows and a plurality of columns intersecting said rows at crosspoints, and a link circuit at each crosspoint;

and further comprising:

signal conditioning circuits operatively connecting the outputs of said transmitters to said link circuits to standardize output pulses from the transmitters before applying them to said link circuits.

13. A system according to claim 12, wherein link circuits are operatively connected to said digitally controlled pulse modifying circuit means.

14. A system according to claim 13, and further comprising amplifiers operatively connecting said digitally controlled pulse modifying circuit means to said receivers.

15. A system according to claim 10, wherein said central processing unit is operatively connected to receive input commands from said transmitters.

16. A blanking system for use with a plurality of RF transmitters and receivers in sufficient proximity to said transmitters that signal interference between them is possible, said blanking system comprising:

a central processing unit having inputs for receiving instructions and blanking commands;

a memory for storing digitally encoded pulse treatment parameters, said memory being operatively coupled to said central processing unit;

a digitally controlled switching matrix having a plurality of rows operatively connected to receive input pulses from RF transmitters, a plurality of columns operatively connected to respective pulse output terminals, and a plurality of binary logic devices at the crosspoints between said rows and columns, each of said logic devices having a first input connected to a corresponding row and an output connected to a corresponding column;

a plurality of link control circuits each having two inputs and having an output connected to a second input of a corresponding binary logic device in the switching matrix;

and row address column decoders operatively connected between said central processing unit and the inputs of said link control circuits to operate the latter in accordance with parameters stored in said memory, whereby to connect certain rows to certain columns for passing RF transmitter pulses to the corresponding pulse output terminals.

17. A blanking system according to claim 16, wherein said link control circuits include respective latches enabling a single row to be connected in succession to several columns in accordance with parameters stored in said memory.

18. A blanking system for use with a plurality of RF transmitters and receivers in sufficient proximity to said transitters that signal interference between them is possible, said blanking system comprising:

a central processing unit having inputs for receiving instructions and blanking commands;

a memory for storing digitally encoded pulse treatment parameters, said memory being operatively coupled to said central processing unit;

a digitally controlled switching matrix having a plurality of rows operatively connected to receive input pulses from RF transmitters, a plurality of columns operatively connected to respective pulse output terminals, and a plurality of binary logic devices at the crosspoints between said rows and columns, each of said logic devices having a first input connected to a corresponding row, a second input, and an output connected to a corresponding column;

a row address decoder operatively connected to said central processing unit to receive row input data and operative to producing a corresponding row enable output signal on one of a plurality of outputs from said decoder;

and a plurality of multi-bit addressabe latches, each having a single row enable input terminal connected to a corresponding output of the row address decoder, a plurality of column data input terminals operatively connected to receive column input data from said central processing unit, and a plurality of output terminals each connected to said second input of a corresponding binary logic device in the switching matrix;

each of said latches being operable in accordance with the signals at its row enable input terminal and its column data input terminals to control the actuation of the binary logic devices connected to its output terminals.

19. A blanking system according to claim 18, wherein each of said latches has all of its outputs connected to said second inputs of binary logic devices at crosspoints for a single row of the switching matrix.

* * * * *